United States Patent [19]

Shu et al.

[11] Patent Number: 5,232,675

[45] Date of Patent: Aug. 3, 1993

[54] RARE EARTH-CONTAINING HIGH-SILICA ZEOLITE HAVING PENTA-SIL TYPE STRUCTURE AND PROCESS FOR THE SAME

[75] Inventors: Xingtian Shu; Wei Fu; Mingyuan He; Meng Zhou; Zhicheng Shi; Shugin Zhang, all of Beijing, China

[73] Assignees: Research Institute of Petroleum Processing; China Petrochemical Corporation, both of Beijing, China; a part interest

[21] Appl. No.: 820,385

[22] Filed: Jan. 14, 1992

[51] Int. Cl.$^5$ .................. C01B 33/26; B01V 29/08
[52] U.S. Cl. ..................... 423/328.2; 423/328.1; 423/329.1; 423/330.1; 423/332; 423/709; 423/718; 502/64; 502/65; 502/79
[58] Field of Search ............... 502/65, 64, 79; 423/328, 328.1, 328.2, 329.11, 330.11, 332, 709, 718

[56] References Cited

U.S. PATENT DOCUMENTS

| | | | |
|---|---|---|---|
| 3,702,886 | 11/1972 | Argmer et al. | 423/322 |
| 3,930,987 | 1/1976 | Grand | 502/65 |
| 4,175,114 | 11/1979 | Plank et al. | 423/329 |
| 4,275,047 | 6/1981 | Whittam | 502/60 |
| 4,283,309 | 8/1981 | Gladrow | 502/64 |
| 4,374,294 | 2/1983 | Chu et al. | 585/466 |
| 4,440,868 | 4/1984 | Hettinger et al. | 502/65 |
| 4,508,840 | 4/1985 | Cormier et al. | 502/70 |
| 4,650,655 | 3/1989 | Chu et al. | 423/328 |
| 4,873,211 | 10/1989 | Walker et al. | 502/214 |

FOREIGN PATENT DOCUMENTS 20333589  5/1980  United Kingdom .

*Primary Examiner*—Anthony McFarlane
*Attorney, Agent, or Firm*—Roylance, Abrams, Berdo & Goodman

[57] ABSTRACT

The present invention discloses a rare earth-containing high-silica zeolite having penta-sil type structure and process for the same. The anhydrous composition of the high-silica zeolite of the present invention (based on the mole ratio of oxides) can be defined by the formula $$xRE_2O_3 \cdot yNa_2O \cdot Al_2O_3 \cdot zSiO_2$$

in which X=0.01–0.30, y=0.4–1.0, and z=20–60. The high-silica zeolite of the present invention is an useful active component for catalysts.

13 Claims, No Drawings

RARE EARTH-CONTAINING HIGH-SILICA ZEOLITE HAVING PENTA-SIL TYPE STRUCTURE AND PROCESS FOR THE SAME

FIELD OF THE INVENTION

The present invention relates to a crystalline aluminosilicate zeolite and process for the same, especially relates to a rare earth-containing high-silica zeolite having penta-sil structure and process for the same and also the application of the high-silica zeolite in hydrocarbon conversion.

BACKGROUND OF THE INVENTION

Zeolite ZSM-5 developed by Mobil Oil Corporation (U.S. Pat. No. 3,702,886) is a penta-sil type high-silica zeolite having a pore dimension of 0.54–0.56 nm and a framework silica alumina ratio above 12. Based on the unique pore structure of the zeolite, it can be applied extensively as a catalytic material to various processes such as isomerization, disproportionation, catalytic cracking, catalytic dewaxing etc. However, its property is not satisfying in some applications. For example, when the zeolite is used in catalytic cracking of petroleum, the enhancement of gasoline octane is accompanied by the unavoidable obvious decrease of gasoline yield (J. Oil & Gas, May 13, 1985, P. 108). When it is used as an active component of a catalyst, the remarkable framework dealumination occurs during the hydrothermal regeneration of the catalyst may cause significant loss of catalyst activity and shape selectivity (U.S. Pat. No. 4,490,241).

Conventionally, the adsorptive and catalytic properties of a zeolite can the modified through ion-exchange. For example, CaA zeolite obtained by the ion-exchange of NaA zeolite with $Ca^{++}$ possesses excellent ability for separating normal paraffin from iso-paraffin, hence can be used in the dewaxing process in petroleum refining (U.S. Pat. No. 3,201,409). REY zeolite obtained by the ion-exchange of NaY zeolite with $RE^{3+}$ exhibits higher activity and stability than that of NaY, hence becomes the most widely-used active component in catalytic cracking catalysts for decades (U.S. Pat. No. 3,402,976). In the case of ZSM-5 zeolite, the lower charge density within the pore channel as a consequence of the higher silica alumina ratio, the stronger hydrophobility, and the smaller pore opening (0.54–0.56 nm), make it difficult to introduce trivalent state cation such as $RE3+$ into the intra-crystalline structure (P. Cho and F. G. Dwyer, ACS, Symp. Ser., 218,59–78, 1983).

OBJECTS OF THE INVENTION

One object of the present invention is to provide a rare earth-containing penta-sil type high-silica zeolite having narrower pore-opening for overcoming the shortcomings of the prior arts. The framework composition of the catalyst containing the zeolite of the present invention as an active component is more stable during the hydrothermal regeneration process.

Another object of the present invention is to provide a process for synthesizing said high-silica zeolite.

A further object of the present invention is to provide catalysts containing the zeolite of the present invention as active component.

SUMMARY OF THE INVENTION

The rare earth-containing penta-sil type high-silica zeolite of the present invention is a crystalline aluminosilicate high-silica zeolite having an anhydrous chemical composition of the formula (based on the mole ratios of oxides):

$$xRE_2O_3 yNa_2O Al_2O_3 zSiO_2$$

wherein x=0.01–0.30, y=0.4–1.0, z=20–60. Said zeolite possesses X-ray diffraction pattern listed in Table 1, narrower pore opening than that of ZSM-5 zeolite, and 2–4 times higher normal hexane/cyclohexane adsorption ratio than that of ZSM-5 zeolite.

The high-silica zeolite of the present invention is synthesized by using rare earth-containing faujasite as seed in a gel system composed of water glass, aluminium salt, inorganic acid, and water.

The high-silica zeolite of the present invention can be used as catalysts for hydrocarbon conversion in a variety of catalytic conversion processes in the field of hydrocarbon processing and petrochemical processes.

TABLE 1

| X - ray diffraction pattern of the zeolite of the present invention | | | |
|---|---|---|---|
| Zeolite of Example 1 | | H-type zeolite of Example 8 | |
| d (Å) | 100 I/I$_0$ | d (Å) | 100 I/I$_0$ |
| 11.17 | 40 | 11.18 | 37 |
| 10.01 | 35 | 10.01 | 40 |
| 9.76 | 12 | 9.75 | 10 |
| 7.45 | 4 | 7.44 | 3 |
| 7.08 | 1.5 | 7.09 | 1.5 |
| 6.71 | 6 | 6.72 | 3.5 |
| 6.37 | 8 | 6.37 | 7 |
| 6.01 | 11 | 6.00 | 11 |
| 5.72 | 10 | 5.71 | 8 |
| 5.58 | 10 | 5.58 | 9 |
| 5.37 | 3 | 5.38 | 2 |
| 5.15 | 3 | 5.14 | 3 |
| 5.04 | 5 | 5.05 | 5 |
| 4.985 | 8 | 4.983 | 8 |
| 4.621 | 6 | 4.620 | 6 |
| 4.366 | 10 | 4.369 | 7 |
| 4.267 | 13 | 4.265 | 12 |
| 4.090 | 5 | 4.085 | 2 |
| 4.010 | 9 | 4.010 | 7 |
| 3.861 | 100 | 3.856 | 100 |
| 3.819 | 74 | 3.817 | 72 |
| 3.755 | 41 | 3.752 | 36 |
| 3.720 | 49 | 3.719 | 39 |
| 3.650 | 28 | 3.652 | 26 |
| 3.591 | 7 | 3.593 | 4 |
| 3.481 | 9 | 3.479 | 6 |
| 3.447 | 13 | 3.447 | 11 |

DETAILED DESCRIPTION OF THE INVENTION

The present invention provides a rare earth-containing penta-sil type crystalline aluminosilicate high-silica zeolite having an anhydrous chemical composition (based on the mole ratios of oxides) of formula:

$$xRE_2O_3 yNa_2O Al_2O_3 zSiO_2$$

wherein X=0.01–0.30, y=0.4–1.0, z=20–60.

It possesses a X-ray diffraction pattern listed in Table 1 and 2–4 times higher normal hexane/cyclohexane adsorption ratio than that of ZSM-5 zeolite.

The rare earth elements contained in the high-silica zeolite of the present invention originate from the rare earth-containing seeds used for synthesis. The composition of said zeolite is formed through the reaction of rare earth-containing faujasite seeds with the gel system composing of water glass, aluminium salt, inorganic acid, and water. Said rare earth-containing faujasite seed is REY, REHY, or REX, which contains 2-27 wt. % rare earth elements and <7.0 wt. % sodium (both based on the weight of oxide).

The high-silica zeolite of the present invention having above-mentioned anhydrous composition can be converted to H-type high-silica zeolite through ammonium-exchange and calcination, which possesses a X-ray diffraction pattern listed also in Table 1.

Table 2 is a comparison of X-ray diffraction patterns between the high-silica zeolite and H-type of said high-silica zeolite of the present invention and ZSM-5 and H-ZSM-5 zeolite of U.K. Patent No. 1,161,974.

TABLE 2

The comparison of X - ray diffraction patterns.

| ZSM-5 (U.K. Pat. No. 1,161,974) | | Zeolite of the present invention (Example 1) | | HZSM-5 (U.K. Pat. No. 1,161,974) | | H-zeolite of the present invention (Example 8) | |
|---|---|---|---|---|---|---|---|
| d (Å) | $100I/I_0$ | d (Å) | $100I/I_0$ | d (Å) | $100I/I_0$ | d (Å) | $100I/I_0$ |
| 11.10 | 29 | 11.17 | 40 | 11.12 | 100 | 11.18 | 37 |
| 9.97 | 23 | 10.01 | 35 | 9.96 | 55 | 10.01 | 40 |
| 9.70 | 23 | 9.76 | 12 | 9.74 | 47 | 9.75 | 10 |
| 7.44 | 6.5 | 7.45 | 4 | 7.44 | 6.5 | 7.44 | 3 |
| 7.08 | 3 | 7.08 | 1.5 | 7.00 | 5 | 7.09 | 1.5 |
| 6.68 | 3 | 6.71 | 6 | 6.70 | 8 | 6.72 | 3.5 |
| 6.35 | 8 | 6.37 | 8 | 6.36 | 12 | 6.37 | 7 |
| 6.04 | 7 | 6.01 | 11 | 6.02 | 18 | 6.00 | 11 |
| 5.72 | 6 | 5.72 | 10 | / | / | 5.71 | 8 |
| 5.56 | 8 | 5.58 | 10 | 5.57 | 13 | 5.58 | 9 |
| 5.37 | 4 | 5.37 | 3 | 5.37 | 5 | 5.38 | 2 |
| 5.13 | 2 | 5.15 | 3 | 5.15 | 2 | 5.14 | 3 |
| / | / | 5.04 | 5 | / | / | 5.05 | 5 |
| 4.997 | 4 | 4.985 | 8 | 4.994 | 4 | 4.983 | 8 |
| 4.601 | 6 | 4.621 | 6 | 4.603 | 7 | 4.620 | 6 |
| 4.355 | 6.5 | 4.366 | 10 | 4.358 | 5 | 4.369 | 7 |
| 4.259 | 8 | 4.267 | 13 | 4.262 | 9 | 4.265 | 12 |
| 4.077 | 1.5 | 4.090 | 5 | / | / | 4.085 | 2 |
| 3.999 | 6.5 | 4.010 | 9 | 4.002 | 6 | 4.010 | 7 |
| 3.837 | 100 | 3.861 | 100 | 3.842 | 96 | 3.856 | 100 |
| 3.818 | 53 | 3.819 | 74 | 3.822 | 46 | 3.817 | 72 |
| 3.749 | 37 | 3.755 | 41 | 3.752 | 43 | 3.752 | 36 |
| 3.716 | 44 | 3.720 | 49 | / | / | 3.719 | 39 |
| 3.646 | 31 | 3.650 | 28 | 3.649 | 15 | 3.652 | 26 |
| / | / | 3.591 | 7 | / | / | 3.593 | 4 |
| / | / | 3.481 | 9 | / | / | 3.479 | 6 |
| 3.437 | 7 | 3.447 | 13 | 3.442 | 6 | 3.447 | 11 |

Table 2 indicates that, the line intensities of the XRD pattern of the high-silica zeolite of the present invention are evidently different from that of ZSM-5 zeolite, and some new lines appear in the XRD pattern of the zeolite of the present invention, which do not exist in the XRD pattern of ZSM-5 zeolite. The chemical composition of the high-silica zeolite of the present invention is characterized in containing intra-crystalline trivalent rare earth cations. The pore opening of the zeolite of the present invention is narrower than that of ZSM-5 zeolite, and normal hexane/cyclohexane adsorption ratio on the zeolite of the present invention is higher than that on ZSM-5 zeolite. Table 3 is the comparison of normal hexane/cyclohexane adsorption ratio between the high-silica zeolite of the present invention and ZSM-5 zeolite.

TABLE 3

| Example | Adsorption Capacity, mg/g | | n-hexane absorbed/cyc-hexane absorbed |
|---|---|---|---|
| | n-hexane* | cychexane** | |
| 8 | 100.8 | 14.8 | 6.81 |

TABLE 3-continued

| Example | Adsorption Capacity, mg/g | | n-hexane absorbed/cyc-hexane absorbed |
|---|---|---|---|
| | n-hexane* | cychexane** | |
| 9 | 103.5 | 14.2 | 7.29 |
| 10 | 104.2 | 15.1 | 6.90 |
| 11 | 102.9 | 13.9 | 7.51 |
| 12 | 105.1 | 15.6 | 6.74 |
| 13 | 101.7 | 14.6 | 6.96 |
| 14 | 102.5 | 15.0 | 6.83 |
| HZSM-5 | 112.0 | 52.2 | 1.98 |

*The kinetic diameter of n-hexane is 0.43 nm.
**The kinetic diameter of cyclohexane is 0.61 nm.

As shown in Table 3, the normal hexane/cyclohexane adsorption ratios on the high-silica zeolite of the present invention is higher than that on ZSM-5 zeolite.

The performance characteristics of the high-silica zeolite of the present invention, such as better hydrothermal stability and catalytic activity compared to ZSM-5 zeolite, will be further described hereinafter.

The present invention also provides a process for synthesizing said high-silica zeolite, comprising dispersing homogeneously the rare earth-containing faujasite seeds into a gel system composing of water glass, aluminium salt, inorganic acid, and water, crystallizing at 130°-200° C., preferably at 160°-190° C., for 12-60 hours, preferably for 16-30 hours, filtrating, washing, and finally drying.

The mole composition of said gel system is as follows:

$SiO_2/Al_2O_3 = 30-120$ $Na_2O/Al_2O_3 = 2-15$ $H_2O/SiO_2 = 20-100$

Said crystallization seed is REY, REHY, or REX, which contains rare earth elements 2-27% and sodium <7.0% (both based on the weight of oxides). The amount of the seed used should satisfy the mole ratio of $RE_2O_3$ (from seed) and $Al_2O_3$ (in said gel system) being in the range of 0.01–0.40.

Said aluminium salt is $Al_2(SO_4)_3$, $AlCl_3$, and aluminium salts of phosphoric acid such as $AlPO_4$, $Al_2(HPO_4)_3$, or $Al(H_2PO_4)_3$, preferably $AlPO_4$, most preferably $AlPO_4$ gel. $AlPO_4$ gel can be prepared as follows:

Pseudo-boehmite and aqueous phosphoric acid solution are mixed together homogeneously according to the weight ratio $Al_2O_3:H_3PO_4:H_2O = 1:1.5-3.0:5-15$, followed by ageing in still state at ambient temperature for more than 4 hours, preferably for more than 24 hours, to prepare $AlPO_4$ gel.

Said inorganic acid is phosphoric acid, sulfuric acid, hydrochloric acid, or nitric acid. The amount of the inorganic acid used should make the PH value of the system in the range of 10–12.

The preparation of the rare earth-containing faujasite used as seed in the present invention is as follows:

REY zeolite seed

NaY zeolite is exchanged with $RECl_3$ solution according to the weight ratio of zeolite (dry base): $RECl_3:H_2O = 1:0.01-1.0:10-100$, 2.0–50, at 50°–150° C., preferably 60°–120° C. for 0.2–2.0 hours, followed by filtrating and calcining in flowing dry air or 100% steam at 400°–600° C. for 0.5–4.0 hours. The calcined zeolite may undergo above-mentioned exchange-alcination procedure for one more time.

REHY zeolite seed

NaY zeolite is exchanged with aqueous $(NH_4)_2SO_4$ solution according to the weight ratio of zeolite (dry base): $(NH_4)_2SO_4:H_2O = 1:0.2-4.0:10-40$, preferably 1:0.8–2.0:20–30, at 50°–150° C., preferably 80°–120° C., for 0.2–20 hours, followed by filtrating. Said procedure of exchange and filtration can be repeated 1–2 times. The filter cake is calcined in flowing dry air at 400°–600° C. for 0.5–4.0 hours. The calcined zeolite is exchanged with $RECl_3$ solution according to the weight ratio of zeolite (dry base): $RECl_3:H_2O = 1:0.05-1.0:10-100$, preferably 1:0.2–0.8:20–50, at 50°–150° C., preferably 80°–120° C., for 0.2–2.0 hours. After filtration, the filter cake may be calcined in flowing dry air at 400°–600° C. for 0.5–4.0 hours, or may not be calcined.

REX zeolite seed

NaX zeolite is exchanged with $RECl_3$ solution according to the weight ratio of zeolite (dry base): $RECl_3:H_2O = 1:0.01- 1.0:10-100$, preferably 1:0.1–1.0:10–100, preferably 1:0.1–0.6:20–60, at 50°–150° C., preferably at 60°–120° C., for 0.2–2.0 hours. After filtration, the filter cake is calcined in flowing dry air or 100% steam at 400°–550° C. for 0.5–4.0 hours. The above-mentioned exchange-alcination procedure may be repeated for the calcined zeolite.

As mentioned above, the high-silica zeolite of the preset invention contains rare earth elements, possesses penta-sil type structure, has narrower pore opening, better activity-stability for hydrothermal treatment, and better shape selectivity, compared with ZSM-5 zeolite. After conventional $NH_4^+$ exchange and $Na^+$ washing-off, the high-silica zeolite of the present invention can be incorporated with other active components and/or matrix components such as $SiO_2$, $Al_2O_3$, $SiO_2$-$Al_2O_3$, and clays, to formulate catalysts used in various catalytic conversion processes including hydrocarbon processing and petrochemical production, such as catalytic cracking, deep catalytic cracking, catalytic dewaxing, hydrocracking, hydroisomerization, and so forth.

The present invention will be further described with reference to the following samples. However, these examples are not to be construed to limit the scope of the present invention.

EXAMPLE 1

100 g (dry base) NaY zeolite having silica/alumina mole ratio of 5.0 (the $SiO_2/Al_2O_3$ mole ratio was determined by X-ray diffraction in all examples) was dispersed in 2100 g 1.5 wt. % $RECl_3$ (containing 49 wt. % $Ce_2O_3$ and 24 wt. % $La_2O_3$) solution. The ion-exchange proceeded at 90° C. for 30 minutes with stirring. After filtration, the filter cake was calcined in flowing dry air at 550° C. for 2 hours. The above-mentioned exchange-calcination procedure was repeated once more. The REY seed thus obtained had a chemical composition (wt. %) as follows:

$RE_2O_3 18.2, Na_2O 1.5, Al_2O_3 19.5,$ and $SiO_2 60.7.$

The $Na_2O$ content was determined by atomic absorption spectroscopy, while the other components were determined by X-ray fluorescence spectroscopy.

60 g (dry base) pseudo-boehmite was dispersed while stirring homogeneously in 375 g 30 wt. % aqueous $H_3PO_4$ solution. After keeping in still state for 24 hours at ambient temperature, the $AlPO_4$ gel containing 13.5 wt. % $Al_2O_3$ was obtained, which could be diluted to any concentration when in use.

2.8 g above-prepared REY seed was dispersed in 200 g water glass containing 3.5 wt. % $Na_2O$ and 11.1 wt. % $SiO_2$. 54.9 g $AlPO_4$ gel containing 1.1 wt. % $Al_2O_3$ was added to the above mixture while stirring. A 25 wt. % $H_2SO_4$ solution was used to adjust the PH of the above system making it into a gel state. The mole composition of the prepared gel was: $0.26RE_2O_3\ 8.9Na_2O\ Al_2O_3\ 60.0SiO_2\ 0.98P_2O_5\ 2220H_2O$ ($Al_2O_3$ from seed was not included in the calculation, same for other examples). The prepared gel was crystallized at 180° C. for 22 hours. After cooling and filtrating, the filter cake was washed by water to a neutral PH value, followed by drying at 110°–120° C. The obtained high-silica zeolite thereof had an anhydrous chemical composition (based on the mole ratio of oxides, same for other examples) as follows:

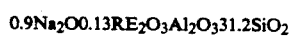
$0.9Na_2O\ 0.13RE_2O_3\ Al_2O_3\ 31.2SiO_2$ and has a $SiO_2/Al_2O_3$ mole ratio of 31.2.

EXAMPLE 2

0.5 g REY zeolite seed prepared in Example 1 was dispersed in 180 g water glass containing 3.8 wt. % $Na_2O$, and 11.0 wt. % $SiO_2$. 38.3 g $AlPO_4$ gel containing 1.1 wt. % $Al_2O_3$ was added to the mixture while stirring. A 11.0 wt. % $H_3PO_4$ solution was used to adjust the PH value of the system making a gel. The mole composition of the prepared gel was:

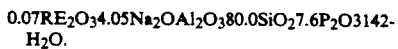
$0.07RE_2O_3\ 4.05Na_2O\ Al_2O_3\ 80.0SiO_2\ 7.6P_2O_3\ 142-H_2O.$

The prepared gel was crystallized at 190° C. for 16 hours, followed by filtrating, washing, and drying as described in Example 1. The obtained high-silica zeolite thereof had an anhydrous chemical composition as follows:

$$0.95Na_2O \cdot 0.03RE_2O_3Al_2O_3 \cdot 52.0SiO_2$$

and had a $SiO_2/Al_2O_3$ mole ratio of 52.0.

EXAMPLE 3

REY zeolite seed was prepared according to the method described in Example 1 except that 100 g NaY zeolite having a silica/alumina mole ratio of 4.2 instead of 5.0 was used, the weight percentages of oxide components in the prepared REY seed were:

$$RE_2O_3:20.1, Na_2O:1.4, Al_2O_3:21.9, \text{ and } SiO_2:56.6.$$

2.5 g REY seed prepared above was dispersed in 195 g water glass containing 3.7 wt. % $Na_2O$ and 11.7 wt. % $SiO_2$. 51.7 g $AlPO_4$ gel containing 1.5 wt. % $Al_2O_3$ was added to the mixture while stirring. A 23 wt. % $H_3PO_4$ solution was added to the system making it into gel state. The mole composition of the gel was:

$$0.21RE_2O_3 \cdot 3.10Na_2O \cdot Al_2O_3 \cdot 50.0SiO_2 \cdot 4.08P_2O_5 \cdot 1680H_2O$$

The gel obtained was crystallized at 185° C. for 20 hours, followed by filtrating, washing, and drying. The high-silica zeolite obtained thereof had a mole composition as:

$$0.77Na_2O \cdot 0.14RE_2O_3Al_2O_3 \cdot 36.3SiO_2$$

and had a $SiO_2/Al_2O_3$ mole ratio of 36.3.

EXAMPLE 4

100 g NaY zeolite having a silica/alumina mole ratio of 5.0 was dispersed in 2100 g 5.0 wt. % $(NH_4)_2SO_4$ solution. The ion-exchange proceeded at boiling temperature for 30 minutes. Distilled water was added during the exchange process to maintain a constant volume. After ion-exchange and filtrating, the filter cake was calcined in flowing dry air at 550° C. for 2 hours. The calcined product was added to 5000 g 1.0 wt. % $RECl_3$ solution. The ion-exchange proceeded at 90° C. for 30 minutes. After filtrating, the REHY seed obtained had a weight percentage composition as follows:

$$RE_2O_3 \, 10.0, Na_2O \, 0.6, Al_2O_3 \, 20.5, SiO_2 \, 68.7$$

3.0 g REHY seed prepared above was dispersed in 180 g water glass containing 3.8 wt. % $Na_2O$ and 110.0 wt. % $SiO_2$, 42.1 g $AlPO_4$ gel containing 0.8 wt. % $Al_2O_3$ was added to the mixture while stirring. A 20 wt. % HCl solution was added to adjust the PH value of the system making it into gel state. The mole composition of the gel was:

$$0.27RE_2O_3 \cdot 12.5Na_2OAl_2O_3 \cdot 100SiO_2 \cdot 0.97P_2O_5 \cdot 3655H_2O$$

The gel obtained was crystallized at 170° C. for 30 hours, followed by filtrating, washing, and drying. The high-silica zeolite obtained thereof had a mole composition as follows:

$$0.86Na_2O \cdot 0.08RE_2O_3Al_2O_3 \cdot 39.5SiO_2$$

and had a $SiO_2/Al_2O_3$ mole ratio of 39.5.

EXAMPLE 5

100 g NaX zeolite having a silica/alumina mole ratio of 2.9 was dispersed in 2500 g 1.5 wt. % $RECl_3$ solution. The ion-exchange proceeded at 90° C. for 30 minutes. After filtration, the filter cake was calcined in flowing dry air at 550° C. for 2 hours. The weight percentage composition of REX seed obtained therefrom was:

$$RE_2O_3 \, 18.5, Na_2O \, 0.6, Al_2O_3 \, 27.9, SiO_2 \, 47.6$$

1.0 g prepared above REX seed was dispersed in 180 g water glass containing 3.5 wt. % $Na_2O$ and 11.1 wt. % $SiO_2$. 42.5 g $AlCl_3$ solution containing 1.0 wt. % $Al_2O_3$ was added to the mixture while stirring. A 30 wt. % $H_3PO_4$ solution was used to adjust the PH value of the system making it into gel state. The mole composition of the gel was:

$$0.13RE_2O_3 \cdot 7.0Na_2OAl_2O_3 \cdot 80.0SiO_2 \cdot 7.2P_2O_5 \cdot 2785H_2O.$$

The obtained gel was crystallized at 150° C. for 45 hours, followed by filtrating and washing. The high-silica zeolite obtained thereof had a mole composition as follows:

$$0.84Na_2O \cdot 0.07RE_2O_3Al_2O_3 \cdot 42.9SiO_2$$

and had a $SiO_2/Al_2O_3$ mole ratio of 42.9.

EXAMPLE 6

REX zeolite seed was prepared according to the method described in Example 5 except that the same exchange-calcination procedure was repeated once more after the filter cake was calcined in flowing dry air at 550° C. for 2 hours. The weight percentage composition of REX seed obtained was:

$$RE_2O_3 \, 25.0, Na_2O \, 1.3, Al_2O_3 \, 26.6, SiO_2 \, 47.0.$$

2.0 g prepared REX seed was dispersed in 200 g water glass containing 3.7 wt. % $Na_2O$ and 11.7 wt. % $SiO_2$. 75.8 g $AlPO_4$ gel containing 1.5 wt. % $Al_2O_3$ was added to the mixture while stirring. A 5.1 wt. % $H_3PO_4$ solution was used to adjust the PH value of the system making it into gel state. The mole composition of the gel was:

$$0.14RE_2O_3 \cdot 2.2Na_2OAl_2O_3 \cdot 35.0SiO_2 \cdot 2.8P_2O_5 \cdot 1580H_2O$$

The gel obtained was crystallized at 195° C. for 13 hours, followed by filtrating, washing, and drying. The high-silica zeolite obtained thereof had a mole composition as follows:

$$0.81Na_2O \cdot 0.10RE_2O_3Al_2O_3 \cdot 24.8SiO_2$$

and had a $SiO_2/Al_2O_3$ mole ratio of 24.8.

EXAMPLE 7

REX zeolite seed was prepared according to the method described in Example 5 except that the same exchange-calcination procedure was repeated once more after the filter cake was calcined in flowing 100% steam at 550° C. for 2 hours. The weight percentage composition of REX seed obtained was:

$$RE_2O_3 \, 25.2, Na_2O \, 1.1, Al_2O_3 \, 25.1, SiO_2 \, 48.6.$$

15 g prepared REX seed was dispersed in 1130 g water glass containing 3.5 wt. % Na$_2$O and 11.1 wt. % SiO$_2$. 130 g Al$_2$(SO$_4$)$_3$ solution containing 2.5 wt. % Al$_2$O$_3$ was added to the mixture while stirring. A 20 wt. % H$_2$SO$_4$ solution was used to adjust the pH value of the system making it into gel state. The mole composition of the gel was:

0.36RE$_2$O$_3$9.7Na$_2$OAl$_2$O$_3$65.6SiO$_2$2380H$_2$O.

The gel obtained was crystallized at 180° C. for 20 hours, followed by filtrating, washing, and drying. The high-silica zeolite obtained thereof had a mole composition as follows:

0.77Na$_2$O0.15RE$_2$O$_3$Al$_2$O$_3$34.5SiO$_2$ and had a SiO$_2$/Al$_2$O$_3$ mole ratio of 34.5.

EXAMPLES 8–14

The high-silica zeolites prepared in Examples 1–7 were ion-exchanged at 90° C. for 1 hour, respectively, according to a weight ratio of zeolite: (NH$_4$)$_2$SO$_4$:H$_2$O=1:1:20. After filtration, the exchange-filtration procedure was repeated once more. The filter cake was then dried at 110°–120° C., calcined at 550° C. for 2 hours. The respective H-type products were thus obtained. Their adsorption properties were listed in Table 3.

COMPARATIVE EXAMPLE 1

5 g ZSM-5 zeolite seed was dispersed in 1 liter water glass (specific gravity 1.3) containing 40.5 g/l Na$_2$O and 126.0 g/l SiO$_2$. 71.6 g 33 wt. % ethyl amine solution and 51.0 g Al$_2$(SO$_4$)$_3$ solution containing 7.0 wt. % Al$_2$O$_3$ were added subsequently to the mixture while stirring. A dilute H$_2$SO$_4$ was used to adjust the pH value of the system making it into gel state. The mole composition of the gel was:

7.9Na$_2$OAl$_2$O$_3$60.0SiO$_2$15.0C$_2$H$_5$NH$_2$2500H$_2$O

The gel obtained was crystallized at 140° C. for 50 hours, followed by cooling, filtrating, washing, and drying. The anhydrous mole composition of the prepared ZSM-5 zeolite was:

1.03Na$_2$OAl$_2$O$_3$45.8SiO$_2$

The prepared ZSM-5 zeolite had a X-ray diffraction pattern listed in Table 2, and a SiO$_2$/Al$_2$O$_3$ mole ratio of 45.8.

COMPARATIVE EXAMPLE 2

The corresponding H-ZSM-5 zeolite was prepared from ZSM-5 zeolite of comparative Example 1 according to the method described in Examples 8–14 and a weight ratio of zeolite: (NH$_4$)$_2$ SO$_4$: H$_2$O=1:1:20. Its adsorption property was listed in Table 3.

EXAMPLE 15

Stability Test

The zeolite prepared in Example 11 was ion-exchanged twice with a 5 wt. % (NH$_4$)$_2$ SO$_4$ aqueous solution at 90° C. for 1 hour (each time) according to a weight ratio of zeolite (dry base): (NH$_4$)$_2$ SO$_4$=1:1. The ion-exchange was followed by filtrating, washing, drying at 110°–120° C., and calcining at 550° C. for 2 hours. The H-type zeolite obtained thereof containing 1.9 wt. % RE$_2$O$_3$ and 0.03 wt. % Na$_2$O.

The washed and dried samples were treated in 100% steam at 800° C. for 1, 2, 4 and 8 hours respectively. Relative crystallinity retention of the treated samples were determined by X-ray diffraction, wherein the relative crystallinity retention was defined as the ratio of the intensity of the diffraction line at the position of Cuk 23.0 of the treated sample and the original sample. The results were listed in Table 4.

TABLE 4

| Treating time (hr.) | Crystallinity retention (%) |
| --- | --- |
| 1 | 90.1 |
| 2 | 86.0 |
| 4 | 85.1 |
| 8 | 85.0 |

After treated in 100% steam at 800° C. for different time length, the H-type zeolite samples were tested in a pulse rector at 480° C. using n-C$_{14}$ alkane as feedstock to evaluate cracking activity, wherein activity=(1-fraction of unconverted n-C$_{14}$) X 100%. The results were listed in Table 5.

TABLE 5

| Treating time (hr.) | n-C$_{14}$ cracking activity (%) |
| --- | --- |
| 0 | 100 |
| 1 | 94 |
| 2 | 85 |
| 4 | 80 |
| 8 | 70 |

COMPARATIVE EXAMPLE 3

ZSM-5 zeolite was treated according to the method of Example 5 to obtain H-ZSM-5 containing 0.01 wt. % Na$_2$O.

The washed and dried said H-ZSM-5 samples were treated in 100% steam at 800° C. for 1, 2, 4, and 8 hours respectively. The relative crystallinity retention of the treated samples were listed in Table 6.

TABLE 6

| Treating time (hr.) | Crystallinity retention (%) |
| --- | --- |
| 1 | 94.0 |
| 2 | 94.2 |
| 4 | 94.0 |
| 8 | 92.8 |

After treated in 100% steam at 800° C. for different time length, the H-ZSM-5 samples were tested in a pulse reactor at 480° C. and atmospheric pressure using n-C$_{14}$ as feedstock to evaluate cracking activity. The results were listed in Table 7.

TABLE 7

| Treating time (hr.) | n-C$_{14}$ cracking activity (%) |
| --- | --- |
| 0 | 100 |
| 1 | 67 |
| 2 | 62 |
| 4 | 45 |
| 8 | 30 |

The results in Tables 4–7 show that, after treated under rather severe condition, the relative crystallinity retention of the high-silica zeolite of the invention can maintain a level above 85%. As far as the figures of the crystallinity retention are concerned, the hydrothermal structure-stability of the zeolite of the invention seems sightly lower than that of H-ZSM-5. However, the hydrothermal activity-stability of the zeolite of the invention is significantly higher than that of H-ZSM-5.

EXAMPLE 16

Activity for deep catalytic cracking 5.3 kg aluminum sulfate solution containing 7.0 wt. % $Al_2O_3$ was dispersed homogeneously in 20 kg water glass (modulus 3.2) containing 5.5 wt. % $SiO_2$ by stirring. A 10 wt. % ammonia water was used to adjust the PH value to 6.5–7.5. A silica-alumina gel containing 25 wt. % $Al_2O_3$ was obtained.

0.145 kg high-silica zeolite prepared according to the method described in Example 1 was ground and dispersed in the above-prepared silica-alumina gel. After homogenizing and spray-drying, the product was twice exchanged with $(NH_4)_2 SO_4$ followed by washing and drying. The catalyst of deep catalytic cracking obtained contained 9 wt. % high-silica zeolite of the invention and less than 0.1 wt. % $Na_2O$.

The prepared catalyst was treated in 100% steam at 800 for 4 hours, and then tested in a pilot fixed-fluidized bed reactor under reaction condition: 580° C., cat/oil ratio 5.0 and WHSV 1.0 $h^{-1}$. The feedstock used was a VGO having a distillation range of 197°–479° C. and Conradson carbon 0.06 wt. %. The results of the deep catalytic cracking test were listed in Table 8.

TABLE 8

| Conversion, wt. % | 84.56 |
|---|---|
| Product yield, wt. % | |
| Cracking gas | 50.65 |
| $H_2$ | 0.38 |
| $CH_4$ | 3.18 |
| $C_2H_6$ | 1.61 |
| $C_2H_4$ | 4.20 |
| $C_3H_8$ | 3.69 |
| $C_3H_6$ | 17.96 |
| $i-C_4^0$ | 3.66 |
| $n-C_4^0$ | 1.28 |
| $C_4^=-1$ | 2.41 |
| $i-C_4^=$ | 6.36 |
| $t-C_4^=-2$ | 3.45 |
| $cis-C_4^=-2$ | 2.47 |
| Gasoline ($C_5$-221° C.) | 26.22 |
| LCO (221–330° C.) | 9.78 |
| Heavy oil (>330° C.) | 5.66 |
| Coke | 7.69 |
| $C_2^= + C_3^= + C_4^=$ | 36.85 |
| $\Sigma C_4^=$ | 14.69 |

COMPARATIVE EXAMPLE 4

The catalyst was prepared according to the method described in Example 16 except that 0.323 kg ZSM-5 zeolite was used for the preparation of catalyst instead of the high-silica zeolite prepared in Example 2 of the present invention. The deep catalytic cracking catalyst obtained thereof contained 18 wt. % ZSM-5 zeolite. The same reaction condition and feedstock as used in Example 16 were used herein for the deep catalytic cracking test. The results were listed in Table 9.

TABLE 9

| Conversion, wt. % | 84.77 |
|---|---|
| Product yield, wt. % | |
| Cracking gas | 48.30 |
| $H_2$ | 0.37 |

TABLE 9-continued

| $CH_4$ | 3.10 |
|---|---|
| $C_2H_6$ | 1.59 |
| $C_2H_4$ | 3.68 |
| $C_3H_8$ | 3.26 |
| $C_3H_6$ | 17.04 |
| $i-C_4^0$ | 3.29 |
| $n-C_4^0$ | 1.13 |
| $C_4^=-1$ | 2.40 |
| $i-C_4^=$ | 6.44 |
| $t-C_4^=-2$ | 3.50 |
| $cis-C_4^=-2$ | 2.50 |
| Gasoline ($C_5$-221° C.) | 29.04 |
| LCO (221–330° C.) | 9.96 |
| Heavy oil (>330° C.) | 5.27 |
| Coke | 7.43 |
| $C_2^= + C_3^= C_4^=$ | 35.56 |
| $C_4^=$ | 14.84 |

The data listed in table 8 and 9 show that although the content of the high-silica zeolite of the present invention in the deep catalytic cracking catalyst is only half of the content of ZSM-5 zeolite in the comparative catalyst, the conversion levels in both catalysts are nearly the same and the olefin yield on the former catalyst is even slightly higher.

EXAMPLE 17

The silica-alumina gel containing 25 wt. % $Al_2O_3$ prepared in Example 16 was also used in this example.

0.368 kg high-silica zeolite prepared according to the process described in Example 1 was ground and dispersed in the above-mentioned silica-alumina gel. After homogenizing and spray-drying, the product was ion-exchanged twice with $(NH_4)_2 SO_4$ followed by washing and drying. The octane-enhancement promoter for catalytic cracking obtained contained 20 wt. % high-silica zeolite of the invention and less than 0.1 wt. % $Na_2O$.

The promoter obtained was treated in 100% steam at 760° C. for 4 hours. After treatment, it was dispersed, according to a ratio of 1:99, to an industrially balanced Y-7 catalyst(REY zeolite based cracking catalyst, produced by the catalyst factory of Qilu Petrochemical Corp., SINOPEC). The well-mixed catalyst was tested in a fixed-fluidized bed reactor under reaction condition of 500° C., cat./oil ratio 3.8, and WHSV 8.0 $h^{-1}$, using VGO (same as the VGO used in Example 16) as feedstock. The results were listed in Table 10.

TABLE 10

| | Balanced Y-7 catalyst | Balanced Y-7 catalyst mixed with the promoter of the present invention |
|---|---|---|
| Conversion, wt. % | 62.26 | 68.55 |
| Product yield, wt. % | | |
| $H_2$—$C_2$ | 1.63 | 1.44 |
| $C_3$—$C_4$ | 14.34 | 16.45 |
| Gasoline ($C_5$-221° C.) | 46.85 | 47.31 |
| LCO (221–330° C.) | 18.90 | 18.42 |
| Heavy oil (>330° C.) | 14.84 | 13.03 |
| Coke | 3.44 | 3.35 |
| Gasoline RON (clear) | 89.2 | 91.0 |
| MON (clear) | 78.6 | 80.2 |
| Octane-barrel | 4179.0 | 4305.2 |

COMPARATIVE EXAMPLE 5

The octane-enhancement promoter for catalytic cracking was prepared according to the process described in Example 17 except that 0.368 kg ZSM-5 zeolite was used instead of high-silica zeolite prepared in Example 1 of the present invention. The content of ZSM-5 in the prepared promoter was 20 wt. %.

The prepared octane-enhancement promoter was treated in 100% steam at 760° C. for 4 hours. The treated sample was dispersed, according to a ratio of 1:99, to an industrially balanced Y-7 catalyst. The well-mixed catalyst was tested for its activity in catalytic cracking reaction according to the process described in Example 17. The results were listed in Table 11.

TABLE 11

| | Balanced Y-7 catalyst | Balanced Y-7 catalyst mixed with ZSM-5 promoter |
|---|---|---|
| Conversion, wt. % | 62.26 | 66.56 |
| Product yield, wt. % | | |
| $H_2$—$C_2$ | 1.63 | 1.43 |
| $C_3$—$C_4$ | 14.34 | 15.57 |
| Gasoline ($C_5$-221° C.) | 46.85 | 46.20 |
| LCO (221-330° C.) | 18.90 | 18.50 |
| Heavy oil (>330° C.) | 14.84 | 14.94 |
| Coke | 3.44 | 3.38 |
| Gasoline RON (clear) | 89.2 | 90.3 |
| MON (clear) | 78.6 | 79.5 |
| Octane-barrel | 4179.0 | 4171.9 |

The data listed in Table 10 and 11 show that the octane-enhancement promoter containing high-silica zeolite of the present invention has higher gasoline octane-barrel and hydrothermal activity-stability.

What we claim is:

1. A synthetic crystalline aluminosilicate zeolite having an anhydrous chemical composition (based on moles of oxides) of formula:

$$xRE_2O_3 \cdot yNa_2O \cdot Al_2O_3 \cdot zSiO_2$$

wherein
x=0.01-0.30, y=0.4-1.0, z=20-60;
said zeolite having the structure of a pentasil and a X-ray diffraction pattern listed in Table 1, and its normal hexane adsorption/cyclohexane adsorption ratio being 2-4 times higher than that of H-ZSM-5 zeolite.

2. A zeolite according to claim 1, wherein the composition of said zeolite is formed through the reaction of rare earth-containing faujasite seeds with the gel system comprising water glass, aluminum salt, inorganic acid and water.

3. A zeolite according to claim 1, wherein the rare earth-containing faujasite seed is REY, REHY, or REX.

4. A zeolite according to claim 3, wherein the rare earth-containing faujasite seed contains 2-27% rare earth elements and less than 7.0% sodium (both based on the weight of oxides).

5. A process for synthesizing a crystalline aluminosilicate zeolite having an anhydrous chemical composition based on moles of oxides of the formula:

$$xRE_2O_3 \cdot yNa_2O \cdot Al_2O_3 \cdot zSiO_2$$

wherein
x=0.01-0.30, y=0.4-1.0, z=20-60,
said zeolite having the structure of a pentasil and an X-ray diffraction pattern listed in Table 1, and its normal hexane adsorption/cyclohexane adsorption ratio being 2-4 times higher than that of H-ZSM-5 zeolite, said process comprising the steps of dispersing rare earth-containing faujasite seed in a gel system comprising water glass, aluminum salt, inorganic acid and water, with oxide mole ratio $SiO_2/Al_2O_3$=30-120, $Na_2O/Al_2O_3$=2-15, and $H_2O/SiO_2$=20-100 and crystallizing at a temperature of 130°-200° C. for 12-60 hours followed by filtrating, washing, and drying.

6. A process according to claim 5, wherein said seed is REY, REHY, or REX, containing rare earth element 2-27% and sodium less than 7.0% (both based on the weight of oxides).

7. A process according to claim 5, wherein the amount of the seed used satisfies the mole ratio of $RE_2O_3$ (present in the seed) and $Al_2O_3$ (in said gel system) in the range of 0.01-0.40.

8. A process according to claim 5, wherein said aluminum salt is $Al_2(SO_4)_3$, $AlCl_3$, $AlPO_4$, $Al_2(HPO_4)_3$, or $Al(H_2PO_4)_3$.

9. A process according to claim 8, wherein said aluminum salt is $AlPO_4$.

10. A process according to claim 9, wherein said aluminum salt is $AlPO_4$ gel.

11. A process according to claim 5, wherein said inorganic acid is phosphoric acid, sulfuric acid, hydrochloric acid, or nitric acid.

12. A process according to claim 5, wherein the amount of said inorganic acid used is sufficient to produce a PH value of the system in the range of 10-12.

13. A process according to claim 5, wherein the temperature of said crystallization proceeds at 160°-190° C. for 16-30 hours.

* * * * *